United States Patent [19]
Iwata

[11] Patent Number: 5,947,482
[45] Date of Patent: Sep. 7, 1999

[54] SEAL STRUCTURE AND SEPARATE PLATE

[75] Inventor: Hiroyuki Iwata, Takatsuki, Japan

[73] Assignee: Exedy Corporation, Neyagawa, Japan

[21] Appl. No.: 08/783,836

[22] Filed: Jan. 13, 1997

[30] Foreign Application Priority Data

Jan. 31, 1996 [JP] Japan .................................. 8-015805

[51] Int. Cl.$^6$ .................................................. F16J 15/12
[52] U.S. Cl. .......................................... 277/592; 277/594
[58] Field of Search .................................. 277/592, 594, 277/596, 591

[56] References Cited

U.S. PATENT DOCUMENTS 3,889,961  6/1975  Farnam .
4,677,014  6/1987  Bechen .
5,582,415  12/1996  Yoshida et al. ..................... 277/235 A

FOREIGN PATENT DOCUMENTS 0 417 494 A2  8/1990  European Pat. Off. .
1 217 153  5/1966  Germany .
34 45 870 C2  6/1986  Germany .
7-71607  3/1995  Japan .

*Primary Examiner*—Anthony Knight
*Assistant Examiner*—Alison K. Pickard
*Attorney, Agent, or Firm*—Shinjyu

[57] ABSTRACT

To improve a sealing function in a seal structure for sealing a passage formed between two members, seal portions 3 seals a passage 9 formed between a valve body 8 and a plate body 2 of a separate plate 1. The seal portions 3 is formed to have a constant width on the plate body 2 of the separate plate 1 corresponding to a shape of an end face portions 8*a* of the valve body 8.

22 Claims, 3 Drawing Sheets

SEAL STRUCTURE AND SEPARATE PLATE

BACKGROUND OF THE INVENTION

A. Field of the Invention

The present invention relates to a seal structure, and more particularly to a seal structure for sealing a passage formed between two members.

B. Description of the Related Art

A variety of control valves and the like are typically provided in a control valve body used in an automotive automatic transmission. A separate plate is clamped between an upper valve body and a lower valve body of the valve body within such a transmission. A number of control holes are formed in the separate plate. The control holes are configured to direct fluid to hydraulic circuits defined in the upper and lower bodies. Portions of the hydraulic circuits are in communication with each other through the control holes of the separate plate. Paper gaskets are disposed on each side of the separate plate and are clamped between the separate plate and upper and lower valve bodies. The hydraulic passages formed on sides of the separate plate in both the valve bodies are sealed by the paper gaskets.

In the conventional transmission valve body example described above, portions of the paper gaskets are exposed in some of the hydraulic passages of the control valve body. Because of the exposure to the hydraulic passages, there is a possibility that the exposed portions of the paper gaskets may be degraded by the hydraulic fluid or working oil within the transmission valve body. Degraded paper gasket material eventually may become suspended in the working oil and may subsequently clog an important fluid passage or orifice within the transmission valve body. Also, the paper gaskets may expand when exposed to vacuum pressure generated in the hydraulic passages reducing the flow of working oil in the passages.

Japanese Patent Application Laid-Open No. Hei 7-71607 discloses a seal structure in which a seal portion is formed on the separate plate by a pattern printing process. Complicated shapes may be realized by using pattern printing methods thus forming a seal portions which conforms to the shape of an end face of the valve body. Namely, the seal portions are designed to avoid being exposed to portion of the hydraulic passages of the valve body that are in communication with sensitive control valves in the valve body thus minimizing the possibility of degradation or peeling of the seal portions that may obstruct the operation of the control valves.

In the seal structure disclosed in Japanese Patent Application Laid-Open No. Hei 7-71607, the various portions of the seal portions are formed to have substantially the same width as corresponding portions of the end face of the valve body. Namely, those portions of the seal portions corresponding to narrow portions of the valve body end face are formed to have a narrow width and those portions of the seal portions corresponding to wide portions of the valve body end face are formed to have a wide width. Since the width of the seal portions varies, and, for example, the liquified seal agent is applied by the screen printing, there may be a non-uniformity in thickness in various portions of the seal portions having differing widths due to surface tension effects. If such a non-uniformity in thickness is generated, the sealing function may be degraded. Furthermore, if the seal portions are formed across the entire width corresponding to the end face of the valve body, the amount of the seal material would be increased. As a result, the cost for the unit of the separate plate and seal portions may be undesirable.

SUMMARY OF THE INVENTION

One object of the present invention is to improve sealing function in a seal structure for sealing the space between adjacent passages formed between two adjacent members.

Another object of the present invention is to reduce the amount of material used in forming seal portions in a seal structure.

In accordance with one aspect of the present invention, a seal structure includes a plurality of seal portions formed on a first surface of a first member, each of the seal portions having a generally constant width. A second member having an end surface is configured for engagement with the first surface, the end surface having a plurality of passages defined thereon and a plurality of end surface portions defined between each pair of adjacent passages, the end surface portions separating the adjacent passages. The seal portions correspond to and are configured to align with the end surface portions.

Preferably, the width of the seal portions is in the range of 1 to 7 mm.

Preferably, the width of the seal portions is in the range of 2 to 3 mm.

Preferably, the seal portions have a generally uniform thickness in the range of 0.06 to 0.18 mm.

Preferably, the seal portions formed on the first member by a pattern printing process.

Preferably, the first and second members at least partially define a valve body of an automatic transmission.

Preferably, the first member is a separate plate and the second member is a portion of a valve body of an automatic transmission and the first member has seal portions formed on two opposing surfaces thereof.

In accordance with a second aspect of the present invention, a plate and seal are formed such that the plate has a plurality of seal portions formed on a first surface thereof, each of the seal portions having a generally constant width. A valve body has an end surface configured for engagement with the first surface of the plate, the end surface having a plurality of passages defined thereon and a plurality of end surface portions defined between each pair of adjacent passages, the end surface portions separating the adjacent passages. The seal portions correspond to and are configured to align with the end surface portions.

Preferably, the valve body and the plate at least partially define a hydraulic circuit Preferably, the width of the seal portions are in the range of 1 to 7 mm.

Preferably, the plate and seal further include a plurality of seal portions formed on a second surface of the plate, each of the seal portions having a generally constant width. A second valve body has a second end surface configured for engagement with the second surface of the plate, the second end surface having a plurality of passage defined thereon and a plurality of second end surface portions defined between each pair of adjacent passages, the second end surface portions separating the adjacent passages. The seal portions correspond to and are configured to align with the second end surface portions.

Preferably, the plate body is formed with a plurality of control holes which provide communication between corresponding one of the passages in the valve body and the second valve body.

Preferably, the width of the seal portions is in the range of 2 to 3 mm.

Preferably, the seal portions have a generally uniform thickness and the thickness is in the range of 0.06 to 0.18.

Preferably, the seal portions are formed of a thermosetting material applied to the plate by a pattern printing process.

By the above invention, it is possible to reduce the amount of the material necessary to form the seal portions while well maintaining seal integrity. It is possible to reduce the amount of the material used to form the seal portions while well maintaining seal integrity. By using a pattern printing process, it is possible to produce seal portions which have a complicated shape.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

The present invention will now be described with reference to the accompanying drawings.

Figure 1:
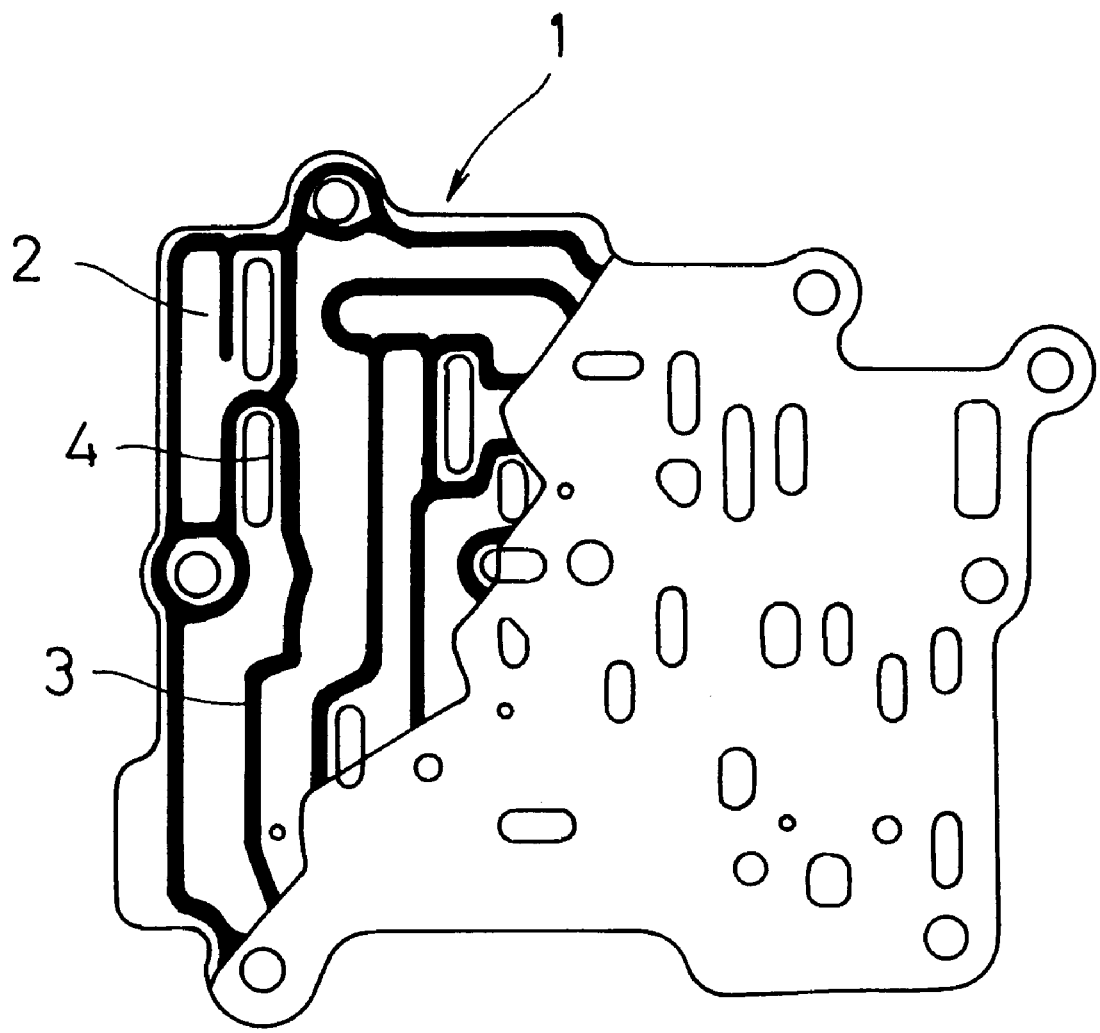
FIG. 1 is a part cutaway, part elevation view of a transmission valve body and separate plate in accordance with a first embodiment of the present invention.
Figure 2:
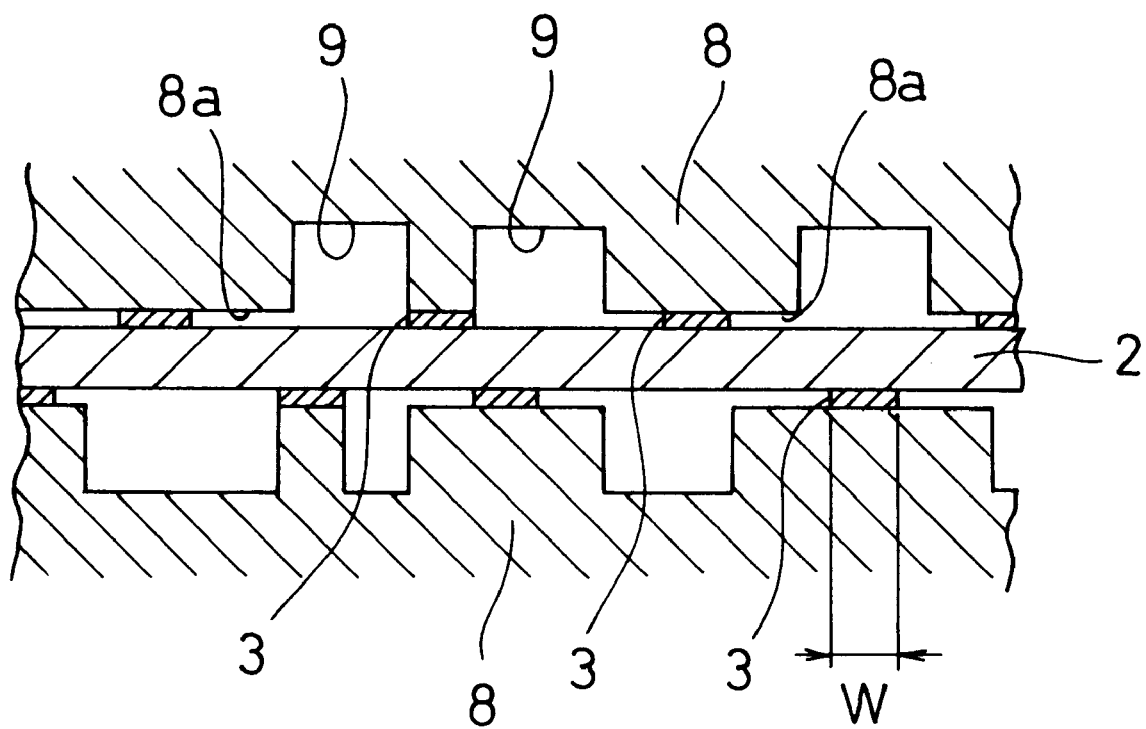
FIG. 2 is a fragmentary cross-sectional view of a portion of the separate plate and valve body depicted in FIG. 1.

FIGS. 1 and 2 show a separate plate 1 which is to be used between valve bodies of a control valve of an automatic transmission. The separate plate 1 is mainly composed of a plate body 2 made of metal, and a plurality of seal portions 3 formed on each side of the plate body 2. A large number of control holes 4 are formed in the plate body 2.

As is shown in FIG. 2, the seal portions 3 are formed to correspond to end face portions 8a of a valve body 8. The end face portions 8a are formed on the valve body 8 between hydraulic passages 9 of the valve body 8 in the plate body 2. The seal portions 3 form an intricate pattern, as shown in FIG. 1, the pattern conforming to the shapes defined by the end face portions 8a.

The seal portions 3 are made by a screen printing process and their width W is determined by the intended use of the bodies to be attached to the plate body 2, but typically the seal portions 3 have a width W in the range of 1 to 7 mm. When the seal portions 3 are intended for use in an automatic transmission (not shown), it is more preferable that the width W be in the range of 2 to 3 mm. A thickness of each seal portions 3 is in the range of 0.06 to 0.18 mm. The material used for forming the seal portions 3 is a preferably a flexible thermosetting material such as an epoxy resin or phenolic resin which remains flexible after heating. The thickness of the seal is preferably uniformally constant but deviations of the thickness of the seal portions 3 over the surface of the plate body 2 equal to or less than ±0.01 mm are acceptable. In the preferred embodiments, test results show that the seal portions 3 have a compression ratio of about 3.18% and a restoration rate of about 97.3%. The compression ratio and the restoration rate were measured under conditions where a pressure member had a diameter of 20 mm and a weight of 0 to 98.1 N. Under these conditions, the seal portions 3 was compressed such that there was a loss of about 3.18% of volume and when the load was released the seal restored to about 97.3% of its original volume.

Figure 3:
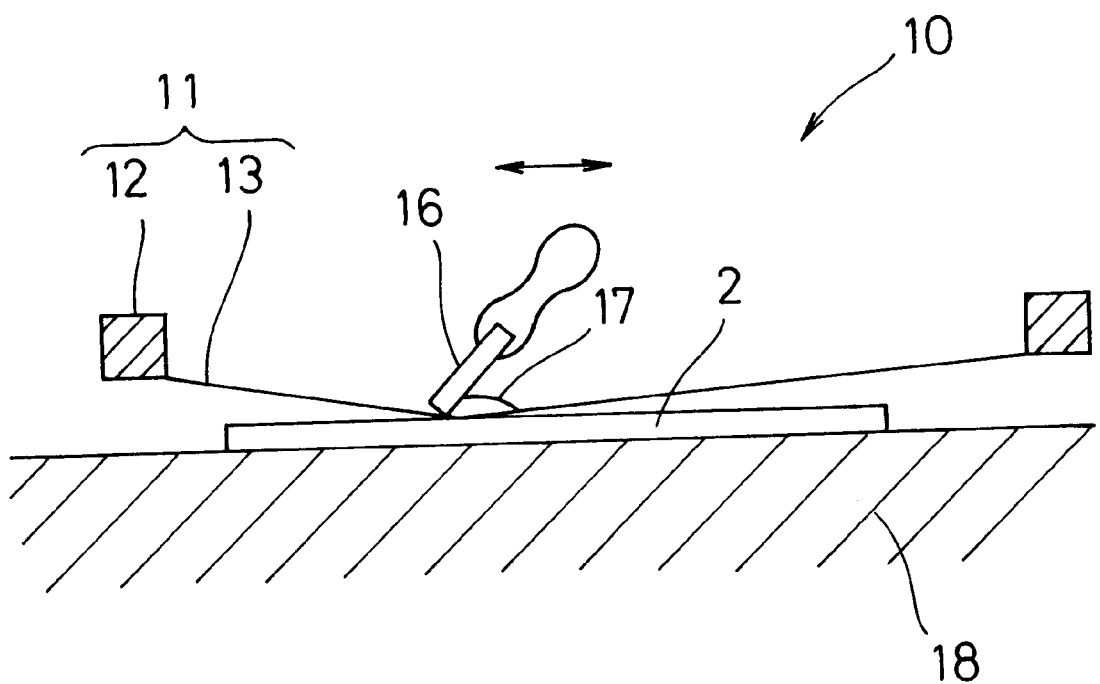
FIG. 3 is a side schematic view showing a process for forming a seal portions on the plate body by screen printing.

As shown in FIG. 3, a screen printing apparatus 10 is used for forming the seal portions 3. The screen printing apparatus 10 includes a screen 11, a spreader 16 and a base table 18. The screen 11 is composed of a printing frame 12 and a screen material 13 tensed within the printing frame 12. The screen material 13 is preferably made from stainless steel wire woven into a screen material having anywhere between 30 to 180 holes per square inch formed therein. The exact shape and size of the desired seal portions 3 are defined by the screen material 13.

The screen 11 is positioned above the plate body 2 arranged above the base table 18. A thermosetting resin 17 is arranged on the screen material 13 of the screen 11. Furthermore, the thermosetting resin 17 is applied and printed to the plate body 2 through the screen 11 by the spreader 16. A viscosity of the thermosetting resin 17 is 60,000 to 110,000 cps/20° C. The pressure applied to the spreader 16 is 29.4 to 98.1 N/cm$^2$ and its operating velocity is 200 to 500 mm/sec. A permeation width formed in the screen material 13 is kept constant so that the thermosetting resin may be applied over the entire surface at a constant width. For this reason, the thickness of the seal portions may be kept constant. The thickness of the seal portions 3 is determined by the amount of the applied thermosetting resin and wettability of the plate body 2, where wettability relates to the ability of the solid surface to be wetted when in contact with a liquid.

After applying the seal material, the seal portions 3 are completed by hardening the thermosetting resin 17 applied on the plate body 2 by heating.

After completion of the seal portions on the separate plate 1, the separate plate 1 may be clamped between the valve body 8, as shown in FIG. 2. It should be noted that since the seal portions 3 are formed on the plate body 2 to correspond only to end face portions 8a in a manner such that the seal portions are either spaced apart from the hydraulic passages 9 of the valve body 8 or the seal portions are aligned with the edges of the hydraulic passages as shown in FIG. 2, the problem of degradation or flaking of portions of the seal are minimized or eliminated. Formation of the seal portions 3 using a screen printing process provides a generally accurate means of forming the seal.

Since the width of the seal portions 3 is kept constant irrespective of the size and width of the end face portions 8a of the valve body 8, as is apparent from FIG. 2, gaps are formed on either side of some portions of the seal portions 3, in particular where the width of the end face portions 8a is large.

Furthermore, since the width of the seal portions 3 is kept substantially constant, the thickness of the seal portions 3 and the cross-sectional shape thereof are kept substantially uniform. Thus, even if the torque for fastening the two valve body 8 is reduced, it is possible to maintain the sealability. Further, it is possible to reduce the number of the fastening bolts that clamp the two valve bodies 8 together and retain seal integrity. Furthermore, the thickness of the seal portions 3 are made to be generally uniform such that local compression stress in the seal portions 3 is minimized. As a result, the seal portions 3 are less likely to be damaged.

The width W of the seal portions 3 may be within the range of 1 to 7 mm, but optimally should be in the range of 2 to 3 mm. Accordingly, it is possible to reduce an amount of the material for forming the seal portions 3 in comparison with the prior art.

Although the seal portions 3 are formed by using the screen printing in the foregoing embodiment, it is possible to use other printing methods such as an intaglio printing.

In the foregoing embodiment, the seal portions are formed on the separate plate. However, it is also possible to form the seal portions on the valve body itself.

Moreover, the present invention is not limited to the control valve bodies of transmissions, but is applicable to other seal structures where two bodies are attached to one another with a seal therebetween.

The seal structure according to the present invention is used to seal the passage formed between the two members and is made of seal portions having a constant width, which are formed to one member of the two members corresponding to the shape of the other member of the two members. If the seal material is in a liquid state and is applied to one of the two members, the thickness of the seal portions may be kept generally constant. As a result, it is possible to enhance the sealing function.

If the width of the seal portions are in the range of 1 to 7 mm, it is possible to reduce the amount of the material to be used for constituting the seal portions while keeping sufficient seal integrity.

It is also preferable that the width of the seal portions be in the range of 2 to 3 mm.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A plate and seal comprising:
   a plate having a plurality of seal portions formed on a first surface thereof, each of said seal portions having a constant predetermined width so that a constant uniform thickness exists throughout the seal portions;
   a valve body having an end surface configured for engagement with said first surface of said plate, said end surface having a plurality of passages defined thereon and a plurality of end surface portions defined between each pair of adjacent passages, said end surface portions separating said adjacent passages; and
   wherein said seal portions correspond to and are configured to align with said end surface portions and said passages are further defined along said seal portions of said first surface of said plate.

2. The plate and seal as in claim 1, wherein said valve body and said plate at least partially define a hydraulic circuit.

3. The plate and seal according to claim 1, wherein the width of the seal portions is in the range of 1 to 7 mm.

4. The plate and seal according to claim 1 further comprising:
   a plurality of seal portions formed on a second surface of said plate, each of said seal portions of said second surface having a constant predetermined width and a uniform thickness;
   a second valve body having an end surface configured for engagement with said second surface of said plate, said end surface of said second valve body having a plurality of passages defined thereon and a plurality of end surface portions of said second valve body defined between each pair of adjacent passages, said end surface portions of said second valve body separating said adjacent passages; and
   wherein said seal portions of said second surface correspond to and are configured to align with said end surface portions of said second valve body.

5. The plate and seal according to claim 4, wherein said plate is formed with a plurality of control holes which provide communication between corresponding one of said passages in said valve body and said second valve body.

6. The plate and seal according to claim 1, wherein the width of said seal portions is in the range of 2 to 3 mm.

7. The plate and seal according to claim 1, wherein said seal portions have a uniform thickness and said thickness is in the range of 0.06 to 0.18 mm.

8. The plate and seal according to claim 1, wherein said seal portions are formed of a thermosetting material applied to said plate by a pattern printing process whereby said thermosetting material is applied by a spreader having between 29.4 and 98.1 N/cm$^2$ applied thereto as said thermosetting material is applied to form said seal portions.

9. The plate and seal according to claim 1, wherein said plate and valve body at least partially define portions of an automatic transmission.

10. The plate and seal according to claim 1, wherein said seal portions are formed of a thermosetting material having a viscosity of 60,000 to 110,000 cps/20_C.

11. The plate and seal according to claim 10, wherein said seal portions have a compression ratio of about 3.18% and a restoration rate of about 97.3%.

12. A plate and seal comprising:
   a plate having a plurality of seal portions formed on a first surface thereof, each of said seal portions being formed with a constant predetermined width and predetermined uniform thickness such that effects of surface tension on said seal portions upon drying is negligible;
   a valve body having an end surface configured for engagement with said first surface of said plate, said end surface having a plurality of passages defined thereon and a plurality of end surface portions defined between each pair of adjacent passages, said end surface portions separating said adjacent passages; and
   wherein said seal portions correspond to and are configured to align with said end surface portions and said passages are further defined along said seal portions of said first surface of said plate.

13. The plate and seal as in claim 12, wherein said valve body and said plate at least partially define a hydraulic circuit.

14. The plate and seal according to claim 12, wherein the width of the seal portions is in the range of 1 to 7 mm.

15. The plate and seal according to claim 12 further comprising:
   a plurality of seal portions formed on a second surface of said plate, each of said seal portions of said second surface having a constant predetermined width;
   a second valve body having an end surface configured for engagement with said second surface of said plate, said end surface of said second valve body having a plurality of passages defined thereon and a plurality of end surface portions of said second valve body defined between each pair of adjacent passages, said end surface portions of said second valve body separating said adjacent passages; and
   wherein said seal portions of said second surface correspond to and are configured to align with said end surface portions of said second valve body.

16. The plate and seal according to claim 15, wherein said plate is formed with a plurality of control holes which provide communication between corresponding one of said passages in said valve body and said second valve body.

17. The plate and seal according to claim 12, wherein the width of said seal portions is in the range of 2 to 3 mm.

18. The plate and seal according to claim 12, wherein the uniform thickness of said seal portions is in the range of 0.06 to 0.18 mm.

19. The plate and seal according to claim 12, wherein said seal portions are formed of a thermosetting material applied to said plate by a pattern printing process whereby said thermosetting material is applied by a spreader having between 29.4 and 98.1 N/cm² applied thereto as said thermosetting material is applied to form said seal portions.

20. The plate and seal according to claim 12, wherein said plate and valve body at least partially define portions of an automatic transmission.

21. The plate and seal according to claim 12, wherein said seal portions are formed of a thermosetting material having a viscosity of 60,000 to 110,000 cps/20_C.

22. The plate and seal according to claim 12, wherein said seal portions have a compression ratio of about 3.18% and a restoration rate of about 97.3%.

* * * * *